No. 758,340. PATENTED APR. 26, 1904.
R. J. THOMPSON.
SAVINGS BANK.
APPLICATION FILED DEC. 20, 1902.
NO MODEL. 2 SHEETS—SHEET 2.
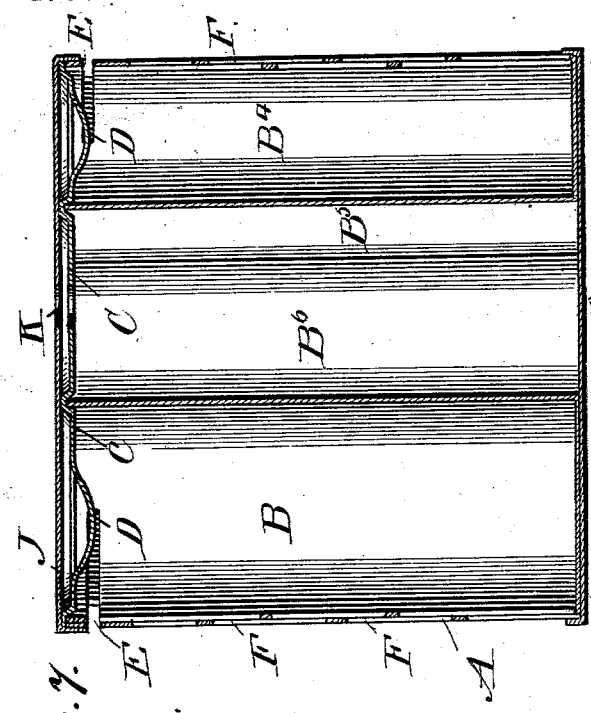
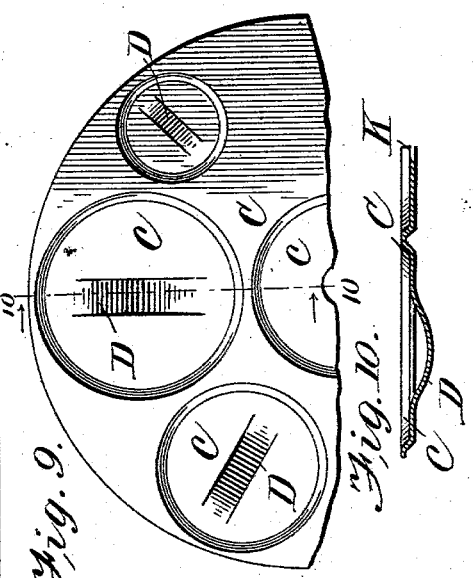
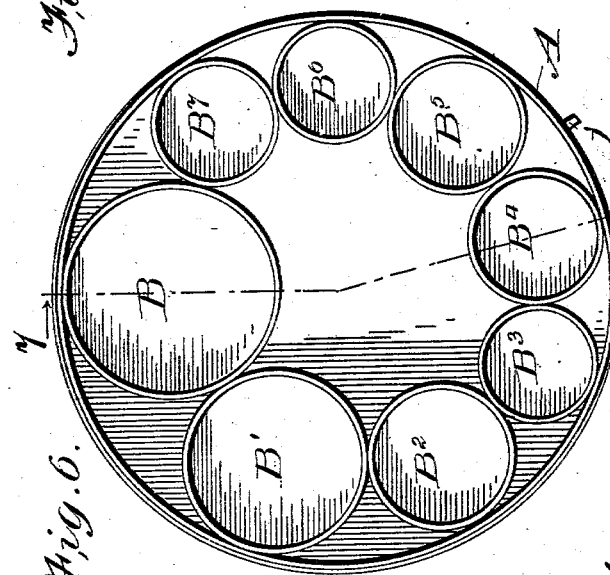
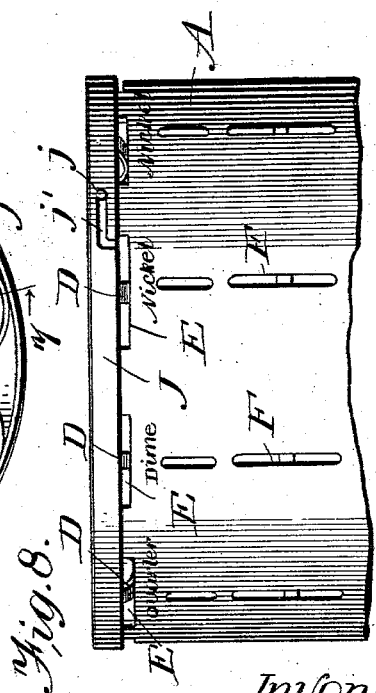
Witnesses:
F. C. Barry
H. S. Gaither
Inventor,
Robert J. Thompson
By Chamberlin & Wilkinson
Attorneys.

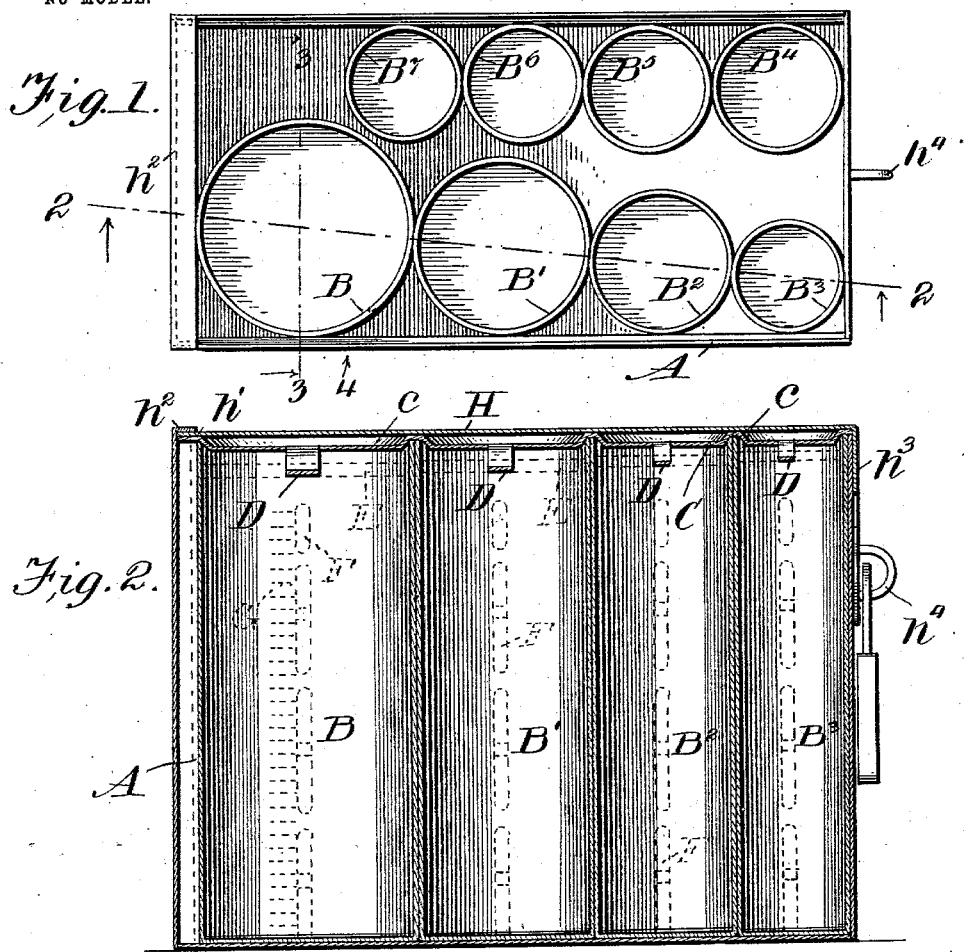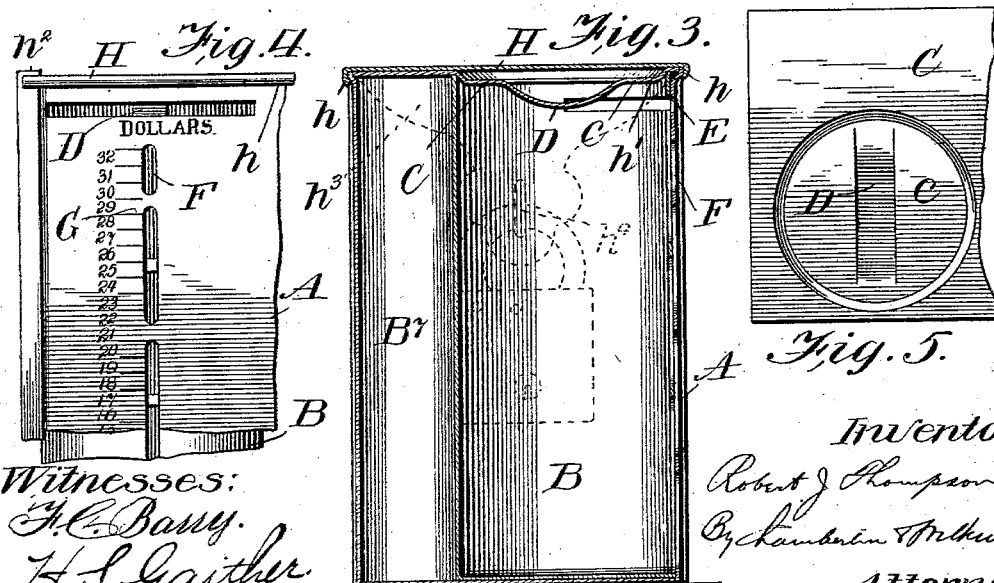

No. 758,340. Patented April 26, 1904.

UNITED STATES PATENT OFFICE.

ROBERT JOHN THOMPSON, OF CHICAGO, ILLINOIS, ASSIGNOR OF ONE-HALF TO ALEXANDER H. REVELL, OF CHICAGO, ILLINOIS.

SAVINGS-BANK.

SPECIFICATION forming part of Letters Patent No. 758,340, dated April 26, 1904.

Application filed December 20, 1902. Serial No. 135,986. (No model.)

*To all whom it may concern:*

Be it known that I, ROBERT JOHN THOMPSON, a citizen of the United States, residing at Chicago, county of Cook, State of Illinois, have invented a certain new and useful Improvement in Savings-Banks; and I declare the following to be a full, clear, and exact description of the invention, such as will enable others skilled in the art to which it pertains to make and use the same, reference being had to the accompanying drawings, which form a part of this specification.

My invention has for its object the production of a portable savings-bank in which shall be provided a series of tubes or compartments for receiving coins, said compartments so arranged that the coins of one denomination are separated from those of another denomination, and provision to lock said coins in the compartments until intentionally removed.

The invention consists in the combination of devices and appliances herein described and claimed.

In the drawings, Figure 1 is a plan view of a structure embodying my invention; Fig. 2, a vertical section on the line 2 2 of Fig. 1; Fig. 3, a vertical section on the line 3 3, Fig. 1; Fig. 4, an elevation of a portion looking in the direction of arrow 4, Fig. 1. Fig. 5 is a detail of a portion of the top plate; Fig. 6, a plan view of variation, showing a circular form instead of an angular form; Fig. 7, a sectional view on the line 7 7, Fig. 6; Fig. 8, a side elevation; Fig. 9, a plan view of the locking-plate; and Fig. 10, a sectional view on the line 10 10, Fig. 9.

In carrying out the invention, A represents the outer case or box or frame of the article. In it is arranged in any suitable manner and engaged and placed in any way that seems most expedient to the manufacturer a series of tubes B and $B^7$, respectively. These tubes may be any desired diameter; but for the purpose of illustrating the invention I have arranged them as shown in Fig. 1, wherein B represents the tube for dollars, B' the tube for half-dollars, $B^2$ the tube for quarters, $B^3$ the tube for dimes, $B^4$ and $B^5$ the tubes for nickels, and $B^6$ and $B^7$ the tubes for pennies.

It is perfectly obvious that the number of these tubes may be increased or diminished, as desired.

C is a plate arranged to fit into the top of the frame A, preferably made of stamped metal, with suitable depressions therein, so that it will fit over the ends of the tubes and hold them in place, as shown at c, Fig. 2. Above each tube a tongue D is stamped out, as shown in section in Figs. 2 and 3, this tongue being opposite the slot E in the outer case A, so that after the coin is inserted it cannot be taken out again through the slot. If desired, the outside of the case may be marked, as shown in Fig. 4, with the name of the coin for which the tube adjacent thereto is designed—as, for instance, the case underneath the slot admitting to the dollar-tube may be marked "Dollars," and so on. Also, if desired, the outer case and tube may be provided with slots F, extending vertically, with graduated marks G, arranged a distance apart, to indicate the number of coins of that denomination within the tube, said graduations being numbered, as shown in Fig. 4. These same graduations and slots while not shown could be arranged opposite each tube, so that on inspection of the number opposite the top coin in any tube there will be at once disclosed the number of those coins within the tube.

H is an outer cover, having side flanges h, which engage the top edge of the case, the end h' of the cover fitting under the turned-over flange $h^2$ of the case, Fig. 2, so that by sliding the cover onto the case in a direction longitudinal of the cover the turned-down end $h^3$ of the cover will fit over a staple $h^4$ in the case, and by passing a padlock through the staple the cover can be locked into place until intentionally removed.

In Figs. 6 to 10 I have shown a structure which instead of being rectangular in shape is cylindrical, the tubes being arranged around the wall of the case and the cover J being engaged to the case by a bayonet-joint made up of the pin j, attached to the case, and the slot j' in the cover for locking the cover in place. There may also be provided an orifice K in the top of the article, through which bills may be inserted.

It is obvious that the case surrounding the tube may be of different forms and structure and that the particular manner of locking the top over the tubes may be varied and that the cross-section of the tubes may be varied and that other materials than metal might be employed for making the tubes without departing from the spirit of the invention, which consists, essentially, in the provision of a series of tubes engaged together to form one article, provided with means for inserting a coin in each tube and provided with means for locking the coin therein until it is intentionally removed.

What I claim is—

1. In a savings-bank, the combination with a case, of a plurality of receptacles located within said case, said case having horizontal slots through the vertical wall thereof near its top registering with slots through the individual receptacles through which coins may be inserted, a plate located above and engaging the tops of said receptacles and thereby retaining the same in fixed relative positions with respect to each other and to the case, and projections depending from said plate into said receptacles and extending below the horizontal planes of the slots leading thereinto.

2. In a savings-bank, the combination with a case, of a plurality of receptacles located within said case, said case having horizontal slots through the vertical wall thereof near its top registering with slots through the individual receptacles, a single cover located above and closing the upper ends of said plurality of receptacles and engaging the vertical walls of said case, and means for locking said cover to said case.

3. In a savings-bank, the combination with a case, of a plurality of receptacles located within said case, said case having horizontal slots through the vertical wall thereof near its top registering with slots through the individual receptacles through which coins may be inserted, a plate located above and engaging the tops of said receptacles and thereby retaining the same in fixed relative positions with respect to each other and to the case, projections depending from said plate into said receptacles and extending below the horizontal planes of the slots leading thereinto, a single cover located above and closing the upper ends of said plurality of receptacles and engaging the vertical walls of said case, and means for locking said cover to said case.

4. In a savings-bank, the combination with a case, of a plurality of receptacles located within said case, said case having horizontal slots through the vertical wall thereof near its top registering with openings communicating with the individual receptacles through which coins may be inserted, a plate located above the tops of said receptacles, and projections depending from said plate into the open upper ends of said receptacles and extending below the horizontal planes of the openings leading thereinto.

5. In a savings-bank, the combination with a case, of a plurality of receptacles located within said case, said case having horizontal slots through the vertical wall thereof near its top registering with openings leading into the individual receptacles through which coins may be inserted, a plate located above the tops of said receptacles, projections depending from said plate into the open upper ends of said receptacles and extending below the horizontal planes of the openings leading thereinto, a cover located above said plate and closing the upper end of said case, and means for locking said cover to said case.

6. In a savings-bank, the combination with a circular case, of a plurality of receptacles arranged in a circle within said case, said case having horizontal slots through the circular wall thereof registering with openings communicating with the individual receptacles through which coins may be inserted, a cover located above said receptacles and closing the upper end of said case, said cover having an opening therethrough communicating with the space within the case surrounded by the receptacles, and means for locking said cover to said case.

7. In a savings-bank, the combination with a circular case, of a plurality of vertical tubular receptacles located within said case and arranged in a circle with the outer surface of said receptacles in contact with the inner surface of said case, said case having horizontal slots through the circular wall thereof near its top registering with openings through the individual receptacles through which coins may be inserted, a plate located above the tops of said receptacles, projections depending from said plate into the open upper ends of said receptacles and extending below the horizontal planes of the openings leading thereinto, a cover located above said plate and closing the upper end of said case, and means for locking said cover to said case.

In testimony whereof I sign this specification in the presence of two witnesses.

ROBERT JOHN THOMPSON.

Witnesses:
C. C. CUNNINGHAM,
H. S. GAITHER.